US012660975B2

(12) United States Patent　　　(10) Patent No.:　　US 12,660,975 B2
Ramesh et al.　　　　　　　　　　(45) Date of Patent:　　Jun. 23, 2026

(54) SYSTEM AND METHOD OF MINIMUM TURN COVERAGE OF ARBITRARY NON-CONVEX REGIONS

(71) Applicants: Megnath Ramesh, Waterloo (CA); Francis Christopher Imeson, Kitchener (CA); Stephen Smith, Kitchener (CA); Baris Fidan, Kitchener (CA)

(72) Inventors: Megnath Ramesh, Waterloo (CA); Francis Christopher Imeson, Kitchener (CA); Stephen Smith, Kitchener (CA); Baris Fidan, Kitchener (CA)

(73) Assignee: AVIDBOTS CORP

( * ) Notice: Subject to any disclaimer, the term of this patent is extended or adjusted under 35 U.S.C. 154(b) by 567 days.

(21) Appl. No.: 17/943,634

(22) Filed: Sep. 13, 2022

(65) Prior Publication Data

US 2023/0277027 A1　　Sep. 7, 2023

Related U.S. Application Data

(60) Provisional application No. 63/243,713, filed on Sep. 13, 2021.

(51) Int. Cl.
*G06Q 20/20*　　　(2012.01)
*A47L 11/40*　　　(2006.01)
　　　(Continued)

(52) U.S. Cl.
CPC ........ *A47L 11/4011* (2013.01); *G05D 1/0219* (2013.01); *G05D 1/0274* (2013.01); *G06F 17/12* (2013.01); *A47L 2201/04* (2013.01)

(58) Field of Classification Search
CPC .. G06F 17/12; A47L 2201/04; A47L 11/4011; G05D 1/0219; G05D 1/0274
(Continued)

(56) References Cited

U.S. PATENT DOCUMENTS

2019/0129435 A1* 5/2019 Madsen ................ B60K 35/00
2020/0089255 A1* 3/2020 Kolling .................. G05D 1/648

FOREIGN PATENT DOCUMENTS

WO WO-2021236054 A1 * 11/2021 ......... G05B 19/4099

OTHER PUBLICATIONS

Forsmann, Joe and Hymas, Rock, "Rectangluar Partitioning", Aug. 2017, University of Washington, pp. 1-6 (Year: 2017).*
(Continued)

*Primary Examiner* — Florian M Zeender

(57) ABSTRACT

A system and method of minimum turn coverage of arbitrary non-convex regions. Coverage planning is the task of generating a path that ensures the tool carried by the robot covers all regions of interest. The number of turns in the path can affect the time to cover the region and the quality of coverage (tools like cameras and cleaning attachments commonly have poor performance around turns). In recent turn-minimizing coverage methods, the region is partitioned to be covered by the least number of rectangles of width equal to the tool's width. The partitioning problem is typically solved using heuristics that have no optimality guarantees. A linear programming (LP) approach is disclosed to generate an axis-parallel coverage plan that minimizes the number of turns taken by the robot. The LP method solves this problem optimally in polynomial time. Coverage plans are generated for real regions using the LP method.

14 Claims, 9 Drawing Sheets

(51) Int. Cl.

| | |
|---|---|
| *G05D 1/00* | (2006.01) |
| *G06F 17/12* | (2006.01) |
| *G06Q 20/40* | (2012.01) |
| *G07G 3/00* | (2006.01) |

(58) Field of Classification Search

USPC .......................................................... 700/245

See application file for complete search history.

(56) References Cited

OTHER PUBLICATIONS

Castillo et al, "Building and Solving Mathematical Programming Models in Engineering and Science", 2002, John Wiley & Sons, Inc., pp. 1, 73, 74 (Year: 2002).*

Choset et al, "Coverage of Known Spaces: The Boustrophedon Cellular Decomposition", 2000, Kluer Academic Publishers, p. 1 (Year: 2000).*

Academic paper (Year: 2002).*

Vandermeulen, I., Gross, R. orcid.org/0000-0003-1826-1375 and Kolling, A. (2019) Turn-minimizing multirobot coverage. In: 2019 International Conference on Robotics and Automation (ICRA). 2019 International Conference on Robotics and Automation (ICRA), May 20-24, 2019, Montreal, Canada. IEEE . ISBN 9781538681763.

M. Torres, D. A. Pelta, J. L. Verdegay, and J. C. Torres, "Coverage path planning with unmanned aerial vehicles for 3D terrain reconstruction," Expert Systems with Applications, vol. 55, pp. 441-451, Aug. 2016.

E. Galceran and M. Carreras, "A survey on coverage path planning for robotics," Robotics and Autonomous Systems, vol. 61, No. 12, pp. 1258-1276, 2013. Publisher: Elsevier B.V.

I. Vandermeulen, R. Groß, and A. Kolling, "Turn-minimizing multirobot coverage," Proceedings—IEEE International Conference on Robotics and Automation, vol. 2019—May, pp. 1014-1020, 2019.

H. Choset and P. Pignon, "Coverage Path Planning: The Boustrophedon Cellular Decomposition," Field and Service Robotics, pp. 203-209, 1998.

S. Bochkarev and S. L. Smith, "On minimizing turns in robot coverage path planning," in 2016 IEEE International Conference on Automation Science and Engineering (CASE), pp. 1237-1242, Aug. 2016. ISSN: 2161-8089.

E. M. Arkin, M. A. Bender, E. D. Demaine, S. P. Fekete, J. S. B. Mitchell, and S. Sethia, "Optimal Covering Tours with Turn Costs," SIAM Journal on Computing, vol. 35, pp. 531-566, Jan. 2005.

* cited by examiner (a)

(b)

(a)                          (b)

ROBOT PARAMETERS USED FOR EXPERIMENTS

| Coverage Tool Width | 0.8 $m$ |
|---|---|
| Maximum Linear Velocity | 1 $m/s$ |
| Linear Acceleration | $\pm0.5$ $m/s^2$ |
| Angular Velocity | 30°/$s$ |

(a)                          (b)

(a)                                        (b)

SYSTEM AND METHOD OF MINIMUM TURN COVERAGE OF ARBITRARY NON-CONVEX REGIONS

CROSS REFERENCE TO RELATED APPLICATIONS

The application claims priority to and the benefit of U.S. Provisional Patent Application Ser. No. 63/243,713, entitled "SYSTEM AND METHOD OF MINIMUM TURN COVERAGE OF ARBITRARY NON-CONVEX REGIONS" filed on Sep. 13, 2021, the disclosure of which is incorporated herein by reference in its entirety.

BACKGROUND

The embodiments described herein relate to autonomous and semi-autonomous cleaning devices, in particular to a system and method for a mapping and localization framework for an autonomous and semi-autonomous cleaning device.

Autonomous and semi-autonomous cleaning devices or robots can move about a surface in an environment. Examples of the autonomous mobile robots include cleaning robots that autonomously perform cleaning tasks within an environment including homes, shopping malls or airports. Many kinds of cleaning robots are autonomous to some degree and in different ways. A cleaning robot can include a controller configured to autonomously navigate the robot about an environment such that the robot can ingest debris as it moves.

Coverage path planning is an automation challenge in which a robot carrying a sensing, or a coverage tool must traverse a path such that the tool covers all regions of interest. This problem has many applications in cleaning robots, agricultural robots, and 3D scene reconstruction to name a few. An ideal coverage plan covers all feasible regions with the robot's tool in the shortest time. However, this problem is NP-hard and thus intractable. To mitigate this, simplified versions of the coverage problem and objectives are considered. For example, minimizing the number of turns is desirable for cleaning robots.

The quality of a coverage path can be measured by a variety of factors; notably the time taken to complete a coverage plan, the area covered, and the number of turns taken by the robot. One objective of this disclosure is to generate high-quality coverage paths by minimizing the number of turns taken by the robot. The reasoning behind this choice is two-fold: (i) the robot travels slower around turns taking longer to cover a given region, and (ii) the amount of coverage while turning is sub-optimal when compared to straight-line paths (e.g., a cleaning tool cannot pick up water and dust properly while turning).

The topic of coverage maps for robot navigation, specifically traversing minimum turns, is known in literature. According to Vandermeulen et al. ("Turn-minimizing Multirobot Coverage," Proceedings—IEEE International Conference on Robotics and Automation, vol. 2019 May, pp. 1014-1020, 2019 and US patent US20200089255A1), an environment is split into rectangles and the number of turns is minimized by merging rectangles horizontally or vertically. The merging is done using a heuristic and the process is run for many trials to obtain the best solution. Merged rectangles are covered by a set of straight-line paths.

According to Choset et al. ("Coverage Path Planning: The Boustrophedon Cellular Decomposition," Field and Service Robotics, pp. 203-209, 1998), the environment is split into smaller regions called cells using a line sweep. Each cell is covered individually by sweeping it back and forth.

According to Bochkarev ("Minimizing Turns in Single and Multi-Robot Coverage Path Planning," 2017), the environment is split into cells using reflex vertices inherent to the boundary. Each cell is covered by back and forth sweeps along an optimal direction that minimizes turns.

According to Torres et al. ("Coverage Path Planning with Unmanned Aerial Vehicles for 3D Terrain Reconstruction", Expert Systems with Applications, vol. 55, pp. 441-451, August 2016), a non-convex polygon is split into a set of smaller sub-polygons (mostly convex) by detecting if lines generated on the convex hull are interrupted. Each polygon is covered along an optimal direction that minimizes turns.

Furthermore, according to Jin et al. ("Optimal Coverage Path Planning for Arable Farming on 2D Surfaces," Transactions of the ASABE, vol. 53, no. 1, pp. 283-295, 2010), the polygon is split into sub-regions by searching for a set of dividing lines in a visibility graph constructed with the vertices of the boundaries and holes. Each sub-region is swept in a direction that minimizes the cost of turns induced by the coverage path.

The optimality of the solution path depends on whether it minimizes turns taken by the robot.

This objective is chosen because:

The robot slows down when taking turns

Coverage around turns is poor (cleaning tool cannot pick up dirt and water properly when taking turns)

There is a desire to provide a solution to minimize turns taken by a robot. There is a further desire to provide better cleaning coverage around turns.

SUMMARY

A system and method of minimum turn coverage of arbitrary non-convex regions. Coverage planning is the task of generating a path that ensures the tool carried by the robot covers all regions of interest. The number of turns in the path can affect the time to cover the region and the quality of coverage (tools like cameras and cleaning attachments commonly have poor performance around turns). In recent turn-minimizing coverage methods, the region is partitioned to be covered by the least number of rectangles of width equal to the tool's width. The partitioning problem is typically solved using heuristics that have no optimality guarantees. A linear programming (LP) approach is disclosed to generate an axis-parallel coverage plan that minimizes the number of turns taken by the robot. The LP method solves this problem optimally in polynomial time. Coverage plans are generated for real regions using the LP method and the results are compared against that of a state-of-the-art coverage approach.

DETAILED DESCRIPTION

Figure 1:
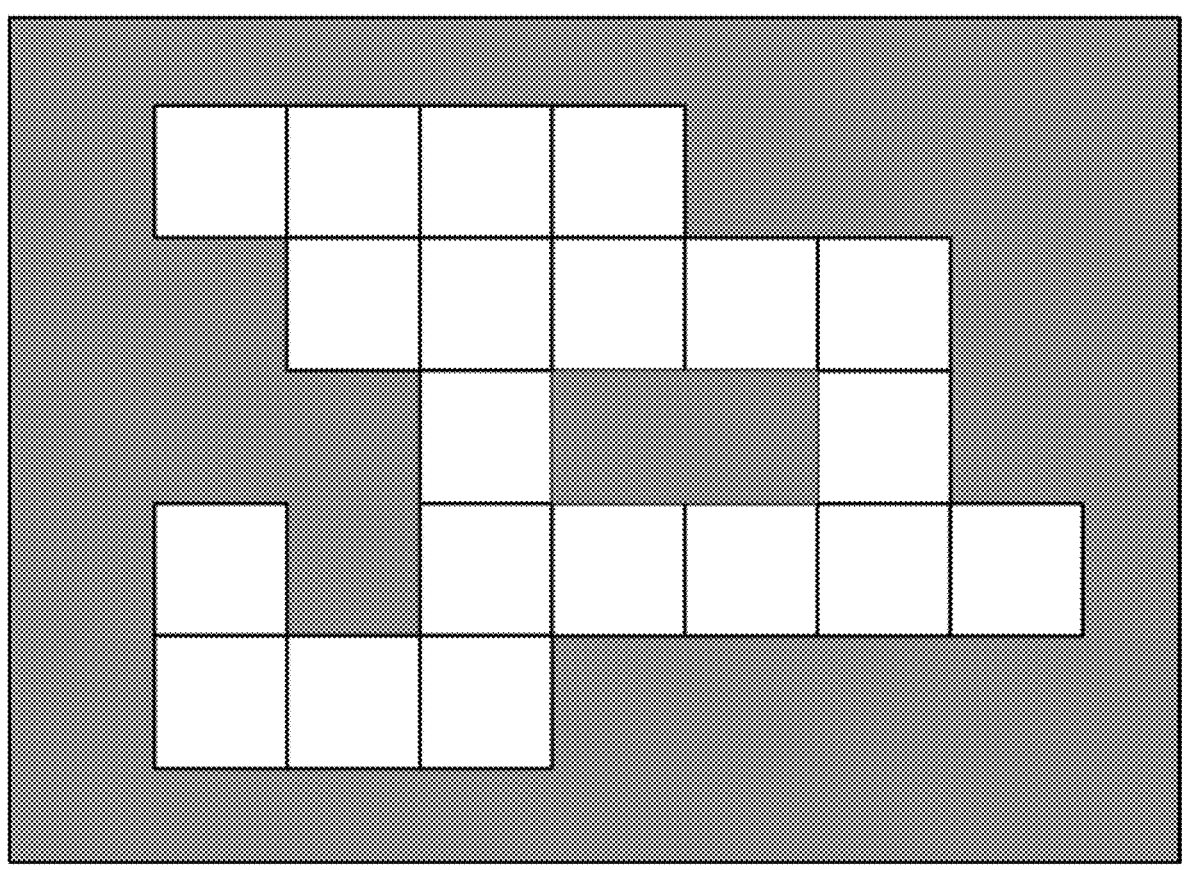
FIG. 1 is a diagram illustrating an Integral Orthogonal Polygon (IOP) with light squares representing the polygon and grey regions representing the boundaries and holes.

According to this disclosure, a linear program formulation to calculate the least number of rectangles of width equal to the tool's width (ranks) to a region in axis-parallel directions is disclosed. Additionally, this formulation solves the sub-problem in polynomial time and guarantees an optimal solution. These straight-line paths required to cover these ranks are used to compute a full coverage plan by formulating the connection problem as a Generalized Travelling Salesman Problem (GTSP). Thereafter, simulations on a set of arbitrary test environments to demonstrate the viability of our approach and perform comparisons with a heuristic-based turn-minimization coverage approach.

A common solution framework is to simplify the problem into three steps:

decompose the environment into sub-regions or cells use the cells to help place coverage lines (straight-line paths) in the environment, and construct the coverage path by computing a tour of the coverage lines.

Given a robot with a coverage tool footprint f operating in a region E, find an optimal path p that covers E with f, where:

The robot's coverage tool (f) can be expressed by a finite polygon.

The robot may have some dynamics that restrict its motion.

The region E will be some closed subset of $R^{\wedge}N$.

The region E will have a boundary.

The region E may have internal obstacles (regions that cannot be visited by the robot).

The solution path will be dynamically feasible.

The typical approach for finding a coverage path for the region that minimizes turns is to first find a set of disconnected straight-line paths that cover the region and then find an optimal path that connects these straight-line paths. However, previous approaches for finding a set of disconnected straight-line paths that cover the region were non-optimal and or ran in non-polynomial time. This is mainly because they involved heuristic-based optimization or complex geometry calculations.

A version of this sub-problem can be optimally solved using a linear program which isn't NP-hard. In this version, the robot covers the region in only horizontal and vertical orientations. The linear program is guaranteed to find the optimal set of disconnected straight-line paths that covers the region in polynomial time.

A tour of the straight-line paths is then generated using a Generalized Travelling Salesman Problem (GTSP) solver to obtain a complete coverage plan. The tour avoids all known obstacles in the region and minimizes the distance to transition between the straight-line paths.

Coverage Planning Problem

Consider a closed and bounded set $W \subseteq R^2$ representing a region, specifically an indoor region. Let O denote the set of obstacles or inaccessible areas of the region. Let $\hat{W}=W\backslash O$ specify the accessible areas of the region.

With this representation of the region, the goal of the coverage plan is to plan a feasible path so that the tool covers all accessible regions in the given region. The tool has a global footprint $A(\omega) \subset R^2$ relative to the robot's position $\omega \in R^2$. Conventionally, $A(\omega)$ is represented by a simple geometric shape such as a square of a fixed width $l \in R$ centered at $\omega$.

According to one embodiment of this disclosure, a square coverage tool of non-trivial size which may not be able to cover the entire region (there will likely be coverage gaps near the boundaries) is adopted. Let $\hat{W} \subseteq \hat{W}$ be the area that can be covered by the tool. The goal of a coverage planning problem is to compute a continuous trajectory such that the union of the coverage tool footprint spans a path $P \subseteq \hat{W}$ such that $$\bigcup_{\omega_i \in P} \mathcal{A}(\omega_i) = \hat{W}.$$

An extension of this problem is to optimize the trajectory such that it minimizes a predefined cost function. According to this disclosure, optimization criteria is to minimize the number of turns taken by the robot during the coverage operation.

Further Simplification

In the plane of the polygon, let us consider a set of orthogonal axes and look at a simplified coverage problem where our square coverage tool can move only in axis parallel (horizontal and vertical) directions. Due to the construction of this simplified coverage problem, a grid-based approximation of the polygon can be used to simplify the search space. This approximation is referred to as an Integral Orthogonal Polygon (IOP), viz. a union of grid-cells of size |X| that approximates the given environment. FIG. 1 is a diagram illustrating an Integral Orthogonal Polygon (IOP) with light squares representing the polygon and grey regions representing the boundaries and holes.

The grid cells are as wide as the coverage tool, where l is also the size of the coverage tool. It is assumed that the robot starts the coverage plan at the center of a grid cell and traverses through the IOP by moving from one grid cell to another. It is also assumed that all paths of the robot has endpoints at the center of the IOP grid-cells, which is similar to the assumption in the Vanermulen reference ("Turn-minimizing Multirobot Coverage," Proceedings—IEEE International Conference on Robotics and Automation, vol. 2019 May, pp. 1014-1020, 2019 and US patent US20200089255A1).

An IOP of a given region can be constructed using a grid overlay and include cells that have overlapping areas with the original map over a certain threshold. Since the IOP is an approximation of the map, the generated plan can be corrected using a post-processing step like the virtual-spring method to make minor modifications to the path. The disclosure focuses on the coverage of the IOP approximation in axis-parallel directions without detailing how to obtain the IOP or the post-processing methodologies.

Furthermore, this disclosure focuses on solving the simplified coverage problem of minimizing the number of axis-parallel straight-line paths (i.e., a heuristic for minimizing the number of turns) to cover all grid-cells of the IOP. Each path covers a set of connected grid cells which are referred to as "ranks". In essence, a rank is the footprint of the robot when traversing a straight-line path (the solution is not allowed to deviate from these straight-line paths). Using this form of coverage, one counts the number of angular transitions required to cover the IOP by counting the number of ranks.

Mixed Integer Linear Programming (MILP) Formulation

According to this disclosure, the axis-parallel coverage of an IOP contains grid cells of length l that closely resembles the region of interest, $\hat{W}$. In axis-parallel coverage, the robot covers each grid cell along one of the two orthogonal axes (horizontally or vertically). To reflect this, each cell c is given a coverage orientation along an axis orient(c) $\in$ {H, V}. To formulate a Mixed Integer Linear Programming (MILP), a series of variables that represent the number of ranks covering the grid cells in their assigned orientations is considered. The optimal result will have ranks covering the greatest number of cells in its direction. The goal of the MILP would then be to compute the orientations of grid cells that minimize the number of total ranks.

Figure 2:
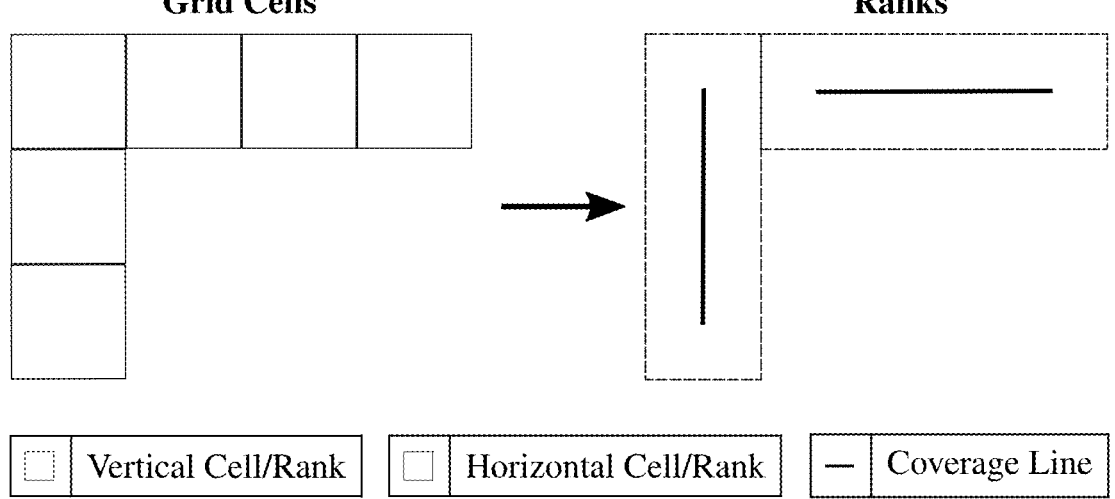
FIG. 2 is a diagram illustrating how orientations translate into ranks.

To ensure these variables do in fact represent ranks, a series of constraints is added that can be interpreted as a series of merges for adjacent cells. Two neighbouring grid cells are merge-able if they are: (i) horizontal neighbours oriented horizontally, or (ii) Vertical neighbours oriented vertically. The number of ranks is therefore a function of the assigned cell orientations. FIG. 2 is a diagram illustrating how orientations translate into ranks.

Using this relationship, an objective function that minimizes the number of ranks covering the IOP and obtains the corresponding cell orientations. To formulate this function, one counts the optimal number of ranks for a given set of oriented IOP grid cells using the following lemma.

Lemma: In any optimal solution for rank coverage of oriented IOP grid cells, each rank terminates at cells with less than two merge-able neighbours.

The following is one such formulation MILP:

$$\min \sum_{i=0}^{n} y_h^i + \sum_{i=0}^{n} y_v^i, \text{ s.t.}$$

$$A_H x_h - y_h \leq 0$$

$$A_V x_v - y_v \leq 0$$

$$x_h + x_v = 1$$

$$x_h, x_v \in \{0, 1\}$$

$$y_h, y_v \geq 0$$

Where, n is number of cells in the environment, $y_h$, $y_v$ count the number of horizontal and vertical ranks respectively, $$x_h^i, x_v^i$$

capture if the cell is to be covered with a vertical or horizontal rank, $A_H$ is the node incidence matrix of the directed graph $G_H$ composed of all horizontal path flows from an IOP grid cell/border identifier to its right neighbour.

$A_V$ is similarly the node incidence matrix of the directed graph $G_V$.

The above formulation can be relaxed and optimally solved as an LP in polynomial time. The proof of this formulation can be found in the publication Ramesh et al. ("Minimum Turn Coverage of Arbitrary Non-Convex Indoor Regions", 2021) which is herein incorporated by reference.

Figure 3:
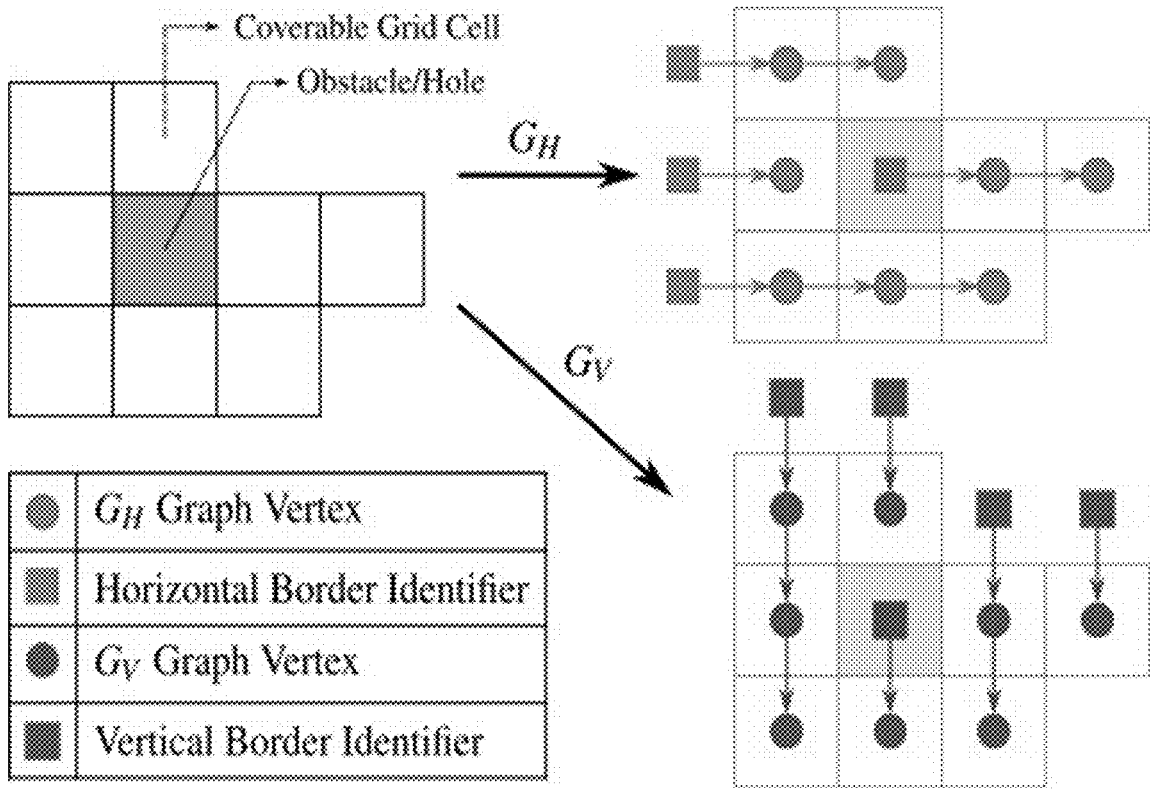
FIG. 3 is a diagram illustrating a directed graph version of the IOP used to encode the node arc incidence matrices.

FIG. 3 is a diagram illustrating a directed graph version of the IOP used to encode the node arc incidence matrices. According to FIG. 3, the directed graph G_H used to construct the NAI matrix is composed of all horizontal path flows from an IOP grid cell/border identifier to its right neighbour. Similarly, the directed graph G_V is composed of all vertical path flows from an IOP grid cell/border identifier to its bottom neighbour.

Experiments

According to this disclosure, a coverage planning approach is tested by running simulations on a variety of maps depicting regions. This approach is compared against the heuristic-based approach proposed in.

The edge costs between the vertices of different sets are given by the subsequent time to travel from one rank to another along an obstacle-free path. The travel time is determined by assuming point robot dynamics and using a constant linear and angular velocity for transitions. The transition paths were computed by constructing a visibility graph within the IOP and planning the shortest obstacle avoiding paths between the rank endpoints. The A* algorithm is used with Euclidean distance as the heuristic function to compute the shortest path between the rank endpoints.

The algorithm was tested in Python 3 and was tested on an M1 Macbook Air with 8 GB of RAM. The GLPK algorithm is used to solve the LP. To compute the tour, Visilibity1 is used to plan the shortest paths between all rank endpoints and GLNS to solve the formulated GTSP problem.

According to this disclosure, the algorithm is compared to the heuristic-based coverage approach proposed in the Vandermeulen reference. A set of hybridized maps are used for this comparison. To solve the same problem of IOP coverage, the interior ranks is considered from the approach and the perimeter ranks are ignored. The metrics for comparison were: (i) the number of ranks generated by the algorithm, (ii) the total length of the transitions between the ranks, (iii) the total time taken for transitions between ranks, and (iv) the number of turns in the transition path. The heuristic algorithm is an iterative algorithm where the performance of the algorithm is linked to the number of iterations it is allowed to run for. To standardize the comparison, the heuristic-based algorithm is run for the same amount of time as the LP algorithm to see which method reaches a better solution.

Decomposition Comparisons

Figure 5:
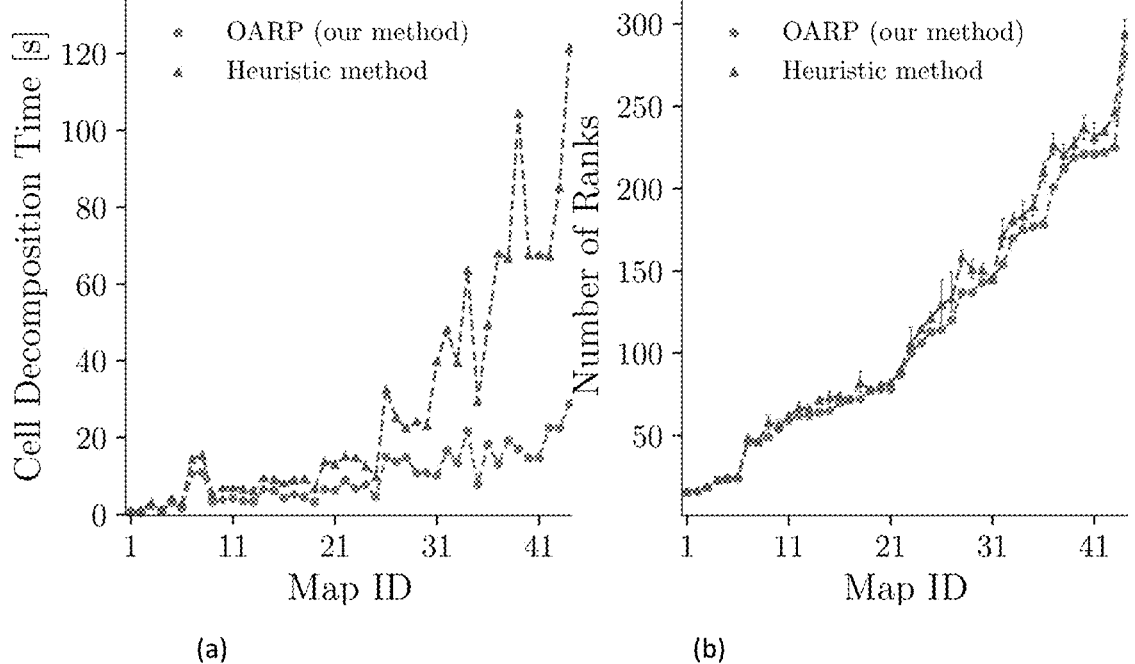
FIG. 5 is a diagram comparing the rank partitioning method with that of the heuristic method.
Figures 6A, 6B:
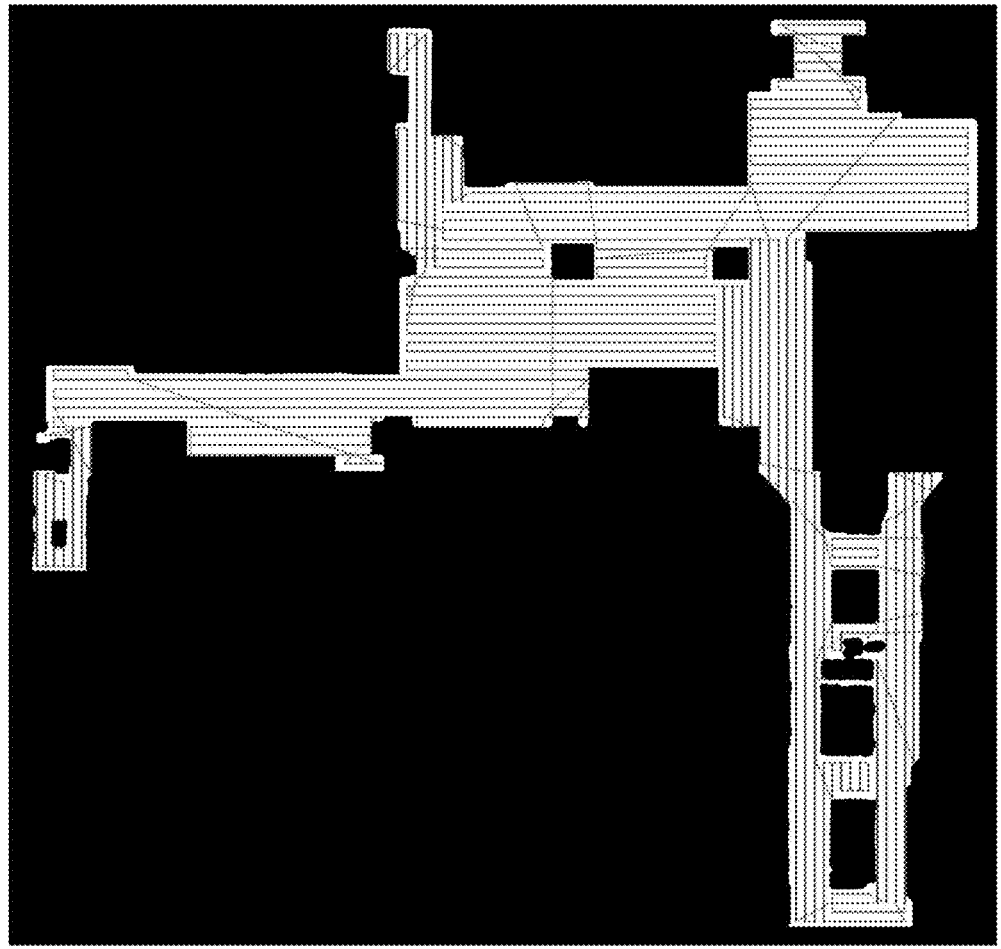
FIG. 6A is a table that illustrates parameters used for the experiments.
FIG. 6B is a diagram illustrating the coverage path of an indoor environment generated using the proposed LP method.

FIG. 5 is a diagram comparing the environment decomposition time of the rank partitioning method with that of the heuristic method. Results as shown in FIG. 6 were derived from experiments on 44 real-world maps. According to FIG. 6, the left side graph illustrates cell decomposition runtime for each map (FIG. 6(a)). The right-side graph illustrates the number of ranks determined for each test environment (FIG. 6(b)).

The results of the comparison are shown in FIG. 5(a), wherein as the complexity of the map increases, the cell decomposition time for the heuristic method increases rapidly. In contrast, Optimal Axis-Parallel Rank Partitioning (OARP) only requires a grid approximation which can be computed much faster; about 50% faster on average and 5 times faster in some cases. This makes a large impact on the overall planner time, especially in cases where the coverage plan would need to be replanned due to perceived changes or uncertainty in the environment.

Rank Partitioning Comparisons

Figure 4:
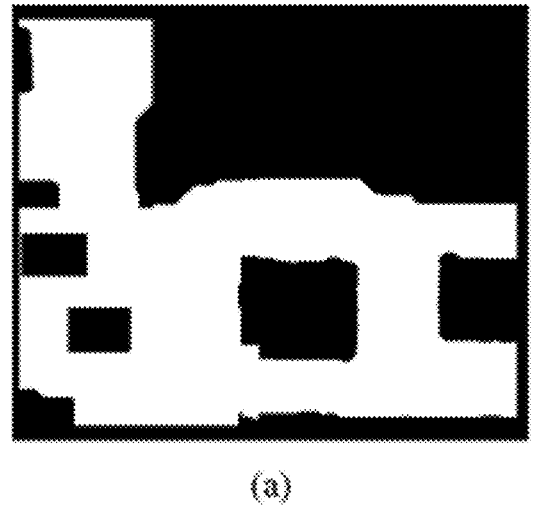
FIG. 4 is a diagram that shows the rank partitioning of an example map with the horizontal and vertical ranks as determined by the LP solver.
Figure 4:
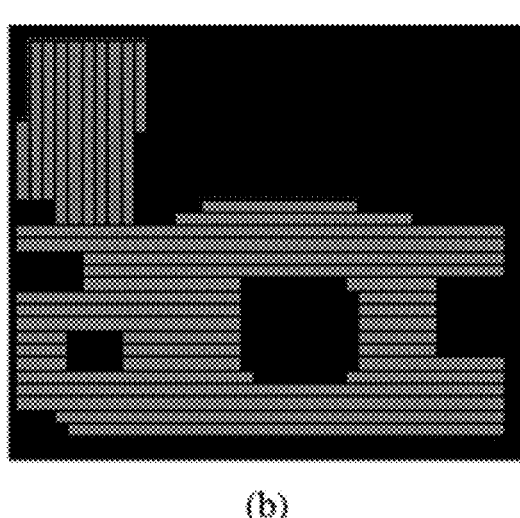

According to the disclosure, a rank partitioning step is performed by expressing the LP and the IOP built in the decomposition step. The algorithm was tested in Python and used the free LP solver, GLPK to solve the LP. The coverage tool width was set to 0.8 m to model a semi-autonomous cleaning device. FIG. 4 is a diagram that shows the rank partitioning of an example map with the horizontal and vertical ranks as determined by the LP solver. According to FIG. 4, the left-side image (FIG. 4(a)) shows an exemplary environment and the right-side image (FIG. 4(b)) shows its optimal rank partitioning obtained using the proposed OARP method showing the horizontal ranks and the vertical ranks.

According to FIG. 4, solving the LP takes an average of 0.4 seconds across all trials for all maps. For the heuristic method, the same IOP coverage problem only included the interior ranks from their method. The heuristic method is an iterative algorithm, where running for more iterations improves the performance. One would need to allow enough l iterations to find high quality solutions but avoid extra iterations after the optimal has been found. In contrast, OARP avoids unnecessary computation by deterministically finding an optimal solution before terminating. To standardize the comparison, the runtime of the heuristic method's partitioning step was limited to that of OARP's partitioning step (the LP's runtime) for each map.

According to the disclosure, FIG. 5(b) shows the results of the experiments. It is observed that the number of ranks obtained by OARP is as good or better than the heuristic method, with the performance gap widening for more complex maps. In general, the heuristic method does quite well, likely due to the tractability of the problem. However, since this problem is solvable in polynomial time, one should choose an optimal solver.

Coverage Tour Comparison

To generate the coverage tour from the ranks, the GTSP formulation is used to compute a tour that minimizes the transition time between the ranks. FIG. 6A is a table that illustrates parameters used for the experiments. According to FIG. 6A, choice of parameters used to compute the transition costs by simulating the robot's coverage tool and dynamics. According to the disclosure, GLNS is used to solve the formulated GTSP problem for both OARP and the heuristic methods.

FIG. 6B is a diagram illustrating coverage path of an indoor environment generated using the proposed LP method. According to FIG. 6B, an example coverage tour for an anonymized environment from our dataset, with the transitions (lines) between the ranks as determined by the GTSP solver.

Figure 7:
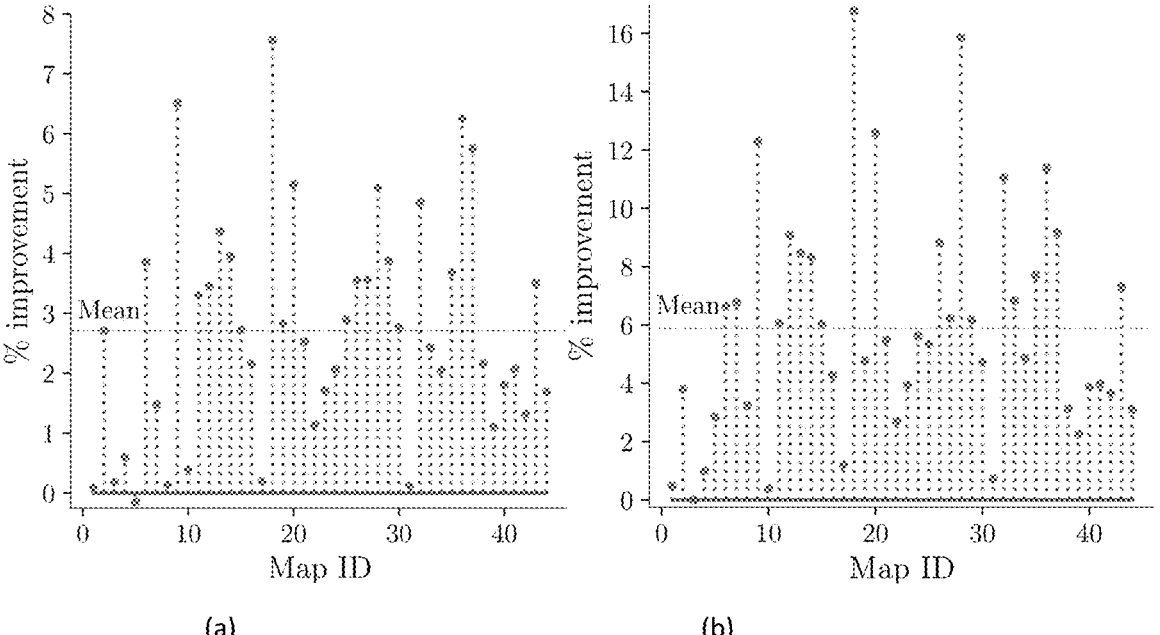
FIG. 7 is a diagram illustrating the average percentage improvement exhibited by the OARP method in comparison with the heuristic method for each map.

According to the disclosure, the coverage tour is compared to those obtained using the heuristic method. Since the ranks are non-overlapping for both methods, the cost of the tour is related to the number of turns. FIG. 7 is a diagram illustrating the average percentage improvement exhibited by the OARP method in comparison with the heuristic method for each map. According to FIG. 7, the metrics are Number of Turns on the left side (FIG. 7(a)) and Coverage Tour cost on the right side (FIG. 7(b)).

According to the disclosure, it is observed that OARP improves the coverage tours on both metrics for almost all maps. For a small number of maps, there was little to no improvement due to the heuristic method providing the same number of ranks as OARP for those maps. On average for all maps, OARP improved the number of turns by 5.9% and the tour cost by around 2.7%. For some maps, there was a 16.8% improvement in the number of turns, and a 7.6% improvement in total coverage time. From this comparison, it is observed from the intended trend that fewer ranks leads to fewer turns, and fewer turns leads to shorter coverage paths.

Comparison Against BCD

According to the disclosure, the OARP method was additionally compared against the Boustrophedon Cell Decomposition (BCD) method (R. Bahnemann, N. Lawrance, J. J. Chung, M. Pantic, R. Siegwart, and J. Nieto, "Revisiting Boustrophedon Coverage Path Planning as a Generalized Traveling Salesman Problem," in Field and Service Robotics Singapore: Springer, 2021, pp. 277-290). For this comparison, the dataset contains over 300 aerial scans of environments with varying numbers of holes (obstacles). The complexity measure of the maps in this dataset is given by hole vertices, i.e., the total number of vertices required to represent the holes in the map (e.g., one triangular hole has 3 vertices). The maximum number of hole vertices in this dataset is 86, whereas in Avidbots' dataset, this number goes up to 900. The BCD on Avidbots' dataset was not tested as it would require significant modifications to the BCD implementation, but one expects to see a similar but exaggerated trend due to the large number of hole vertices. To perform this comparison, one uses the same parameters from; a tool width of 3 m, linear acceleration of +/−1 m/s², and maximum velocity of 3 m/s. Adding turning time to the cost function may also be penalized, where the robot turns in-place with an angular velocity of 30°/s.

Figure 8:
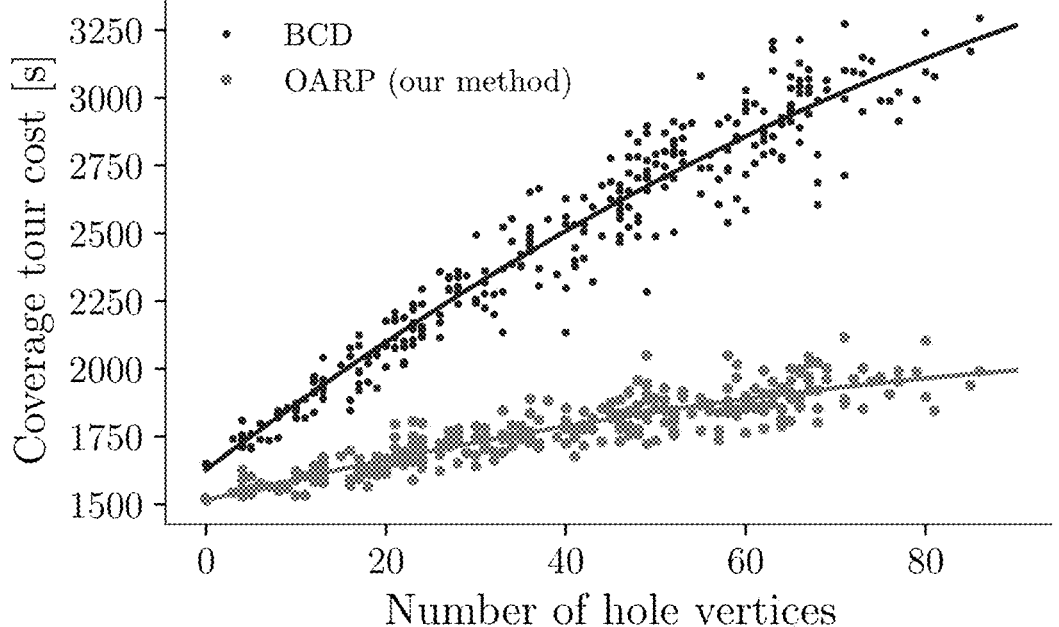
FIG. 8 is a diagram showing the comparison results of the coverage tour generated using OARP and the BCD method.

FIG. 8 is a diagram showing the comparison results of the coverage tour generated using OARP and the BCD method using identical parameters. According to FIG. 8, the x-axis specifies the number of vertices representing the holes in the maps. According to FIG. 8, the OARP outperforms BCD for all maps, and improves the coverage tour by 25.5% on average. This performance gap is due to OARP's better coverage line placement. Furthermore, the heuristic method was also tested on this dataset and it was observed that, while OARP still outperforms, the average performance improvement is small (<1%) due to the relative simplicity of the maps in this dataset.

ROS Simulation Case Study

Figure 9:
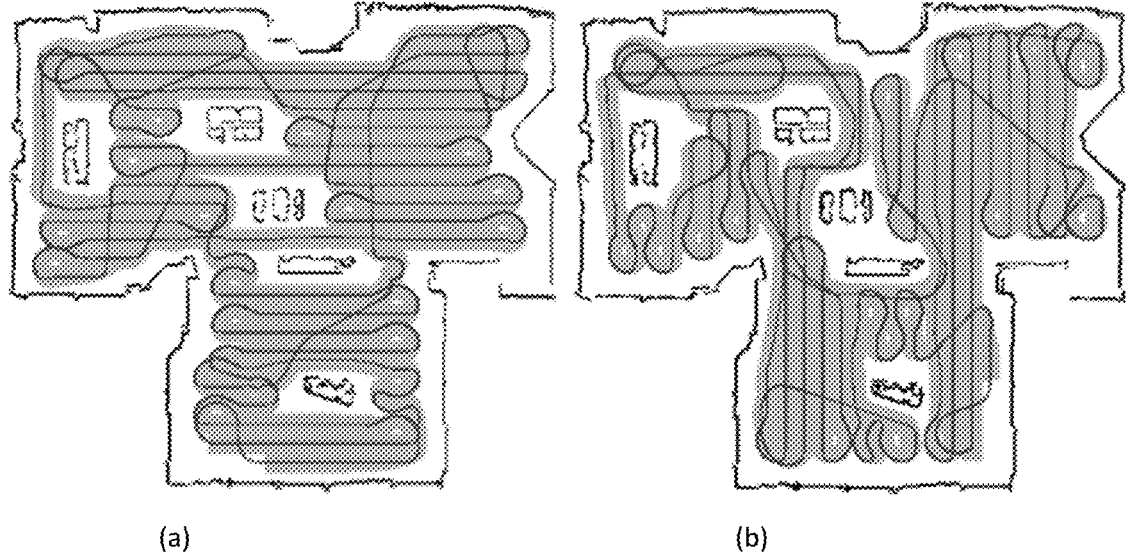
FIG. 9 is a diagram illustrating simulation results of covering an example environment using an exemplary semi-autonomous cleaning device.

FIG. 9 is a diagram illustrating simulation results of covering an example environment using an exemplary semi-autonomous cleaning device. According to FIG. 10, the coverage planners used were OARP (FIG. 10(a)) and the heuristic method (FIG. 10(b)). The simulation was conducted using a real-time operating system (ROS) on an anonymized hybrid environment. The semi-autonomous cleaning device (e.g., Avidbots® Neo® robot) has tricycle dynamics and so coverage was planned with sufficient space at the boundaries to allow comfortable turns. The robot was also equipped with a local planner to replan difficult parts of the coverage plan (e.g. areas with small coverage lines) if necessary.

According to the disclosure, it is observed that the OARP's plan was nearly 13% faster than the heuristic method's plan and 3.3% shorter in path length. Furthermore, the OARP's plan covered more area of this map than the heuristic method's plan (1.1% more). The reasoning for this is two-fold: OARP's path consists of fewer turns (poor coverage at turns), and OARP's plan required fewer replans by the local planner. It was attempted to test the plan generated using the BCD planner from, but the plan contained many sharp turns that are infeasible for the Neo® robot.

General Considerations

According to this disclosure, the OARP coverage planning method aims to minimize the number of turns needed to cover the robot's environment. This is achieved by partitioning the environment into thin axis-parallel ranks using a linear program (LP). Results of this disclosure indicate that this formulation computes the optimal rank partitioning in polynomial time. Furthermore, experiments on maps of real-world environments shows that OARP always achieves the best rank partition in comparison with the state-of-the-art methods. Furthermore, OARP is also shown to have around 6% fewer turns and 3% shorter coverage tours on average than the other method.

While OARP can be used for any environment, applying the axis-parallel constraint may result in "stair-case" paths to cover narrow areas with non-axis-parallel or curved boundaries. Further embodiments of this disclosure may pursue a future research direction of relaxing this constraint to improve coverage of such areas. Further embodiments may also leverage the performance of OARP to develop an online turn-minimizing coverage planner for uncertain dynamic environments.

Another significant difference between the two algorithms is the time required to preprocess the data. The LP method requires a single grid overlay to generate the problem instance to solve, while other state-of-the-art approaches require expensive computational geometry methods to set up the inputs for the algorithm.

According to this disclosure, the objective of minimizing turns is important for robot coverage path planning. A linear programming (LP) approach to minimize the number of turns to cover a region in axis-parallel directions. This approach computes the optimal number of ranks in polynomial time. Simulations of the results indicate that the LP approach obtains the minimum number of ranks quicker than a heuristic-based algorithm of its class.

According to further embodiments, future work involves leveraging the fast performance of the algorithm to develop an online turn-minimizing coverage planner for an uncertain dynamic environment. The LP can also be modified to potentially improve the solution quality by (i) allowing overlap to further reduce the number of ranks, and (ii) improving the quality of the transition paths between the generated ranks.

According to an embodiment of this disclosure, a computer-implemented is disclosed. The computer-implemented method is executed by a processor of a semi-autonomous cleaning apparatus for coverage path planning and is configured for minimum turn coverage of a region. The method comprises the steps of partitioning a region of the coverage path into a plurality of rectangular regions, generating an axis-parallel coverage plan that minimizes the number of turns taken by the cleaning apparatus using a linear programming approach, computing the optimal rank partitioning results in polynomial time, creating a coverage plan with real regions using the linear programming approach, comparing the results with state-of-the-art coverage approach, and sending the results to the cleaning apparatus.

According to the disclosure, the semi-autonomous cleaning apparatus is a cleaning robot. The region further comprises an arbitrary non-convex region. The method further comprises the step of updating a program for a path of travel by the semi-autonomous cleaning apparatus based on the computed results and executing the coverage path plan on the semi-autonomous cleaning apparatus.

According to the disclosure, the step of partitioning the region of the coverage path further comprises partitioning the environment into thin axis-parallel ranks using a linear program approach. The method further comprises using the Optimal Axis-Parallel Rank Partitioning (OARP) method for rank partitioning. The method further comprises applying an axis-parallel constraint, resulting in "stair-case" paths to cover narrow areas with non-axis-parallel or curved boundaries.

According to the disclosure, the linear programming method further comprises a single grid overlay to generate the problem instance to solve. The coverage path planning for the semi-autonomous cleaning apparatus is configured for indoor and outdoor environments. Furthermore, the aforementioned method further utilizes a mixed integer linear programming (MILP) algorithm.

According to further embodiments of the disclosure, the state-of-the-art coverage approach may be selected from a list consisting of the Boustrophedon Cell Decomposition (BCD) method, turning-minimizing multi-robot coverage method, the Boustrophedon Cellular Decomposition method, minimizing turns in single and multi-robot coverage path planning method.

According to this disclosure, experiments and simulations have been performed on an indoor setup, however, the aforementioned algorithms and techniques may also be expanded to outdoor scenarios.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

While the foregoing written description of the system enables one of ordinary skill to make and use what is considered presently to be the best mode thereof, those of ordinary skill will understand and appreciate the existence of variations, combinations, and equivalents of the specific embodiment, method, and examples herein. The system should therefore not be limited by the above described embodiment, method, and examples, but by all embodiments and methods within the scope and spirit of the system. Thus, the present disclosure is not intended to be limited to the implementations shown herein but is to be accorded the widest scope consistent with the principles and novel features disclosed herein.

What is claimed:

1. A computer-implemented method for generating a turn-minimizing coverage path for a semi-autonomous cleaning apparatus operating in an environment with obstacles, the method comprising the steps of:

providing a processor on the semi-autonomous cleaning apparatus, the processor configured for:

receiving map data representing a non-convex environment including inaccessible regions;

generating a grid-based approximation of the environment with cells sized to match a footprint of a cleaning tool mounted on the device;

formulating a mixed-integer linear programming (MILP) problem that assigns orientations to each cell to form maximally mergeable, axis-aligned ranks, wherein each rank corresponds to a straight-line cleaning path;

solving the MILP problem to determine an optimal minimal set of axis-aligned ranks covering all accessible grid cells;

constructing a coverage plan by connecting the ranks using a generalized traveling salesman problem (GTSP) solver that accounts for the robot's dynamic constraints and obstacle avoidance by using real-time sensor input from the semi-autonomous cleaning apparatus;

applying an axis-parallel constraint, resulting in "staircase" paths to cover narrow areas with non-axis-parallel or curved boundaries;

transmitting the constructed coverage plan to the semi-autonomous cleaning device; and executing the constructed coverage path plan on the semi-autonomous cleaning apparatus.

2. The method of claim 1 wherein the semi-autonomous cleaning apparatus is a cleaning robot.

3. The method of claim 1 wherein the regions further comprises an arbitrary non-convex region.

4. The method of claim 1 further comprising the step of updating a program for a path of travel by the semi-autonomous cleaning apparatus based on the computed results.

5. The method of claim 4 further comprising the step of executing the coverage path plan on the semi-autonomous cleaning apparatus.

6. The method of claim 1 wherein the step of partitioning the region of the coverage path further comprises partitioning the environment into thin axis-parallel ranks using a linear program approach.

7. The method of claim 1 further comprising using the Optimal Axis-Parallel Rank Partitioning (OARP) method for rank partitioning.

8. The method of claim 1 wherein the method further comprises a single grid overlay to generate a linear programming problem instance to solve.

9. The method of claim 1 wherein the coverage path planning for the semi-autonomous cleaning apparatus is configured for indoor and outdoor environments.

10. The method of claim 1 the coverage path is selected from a list consisting of the Boustrophedon Cell Decomposition (BCD) method, turning-minimizing multi-robot coverage method, the Boustrophedon Cellular Decomposition method, minimizing turns in single and multi-robot coverage path planning method.

11. The method of claim 1 wherein the formulation of the mixed integer linear programming (MILP) further comprises:

$$\min \sum_{i=0}^{n} y_k^i + \sum_{j=0}^{n} y_v^j, \text{ s.t.}$$

$$A_H x_h - y_h \leq 0$$

$$A_V x_v - y_v \leq 0$$

$$x_h + x_v = 1$$

$$x_h, x_v \in \{0, 1\}$$

$$y_h, y_v \geq 0.$$

12. The method of claim 7, wherein the OARP approach incorporates robot kinematic constraints, including maximum turning radius and minimum acceleration profile.

13. The method of claim 1, further comprising post-processing the computed path using a local planner that adapts to real-time sensor input from the semi-autonomous cleaning apparatus.

14. The method of claim 1, wherein the MILP is solvable in polynomial time.

* * * * *